Patented May 27, 1924.

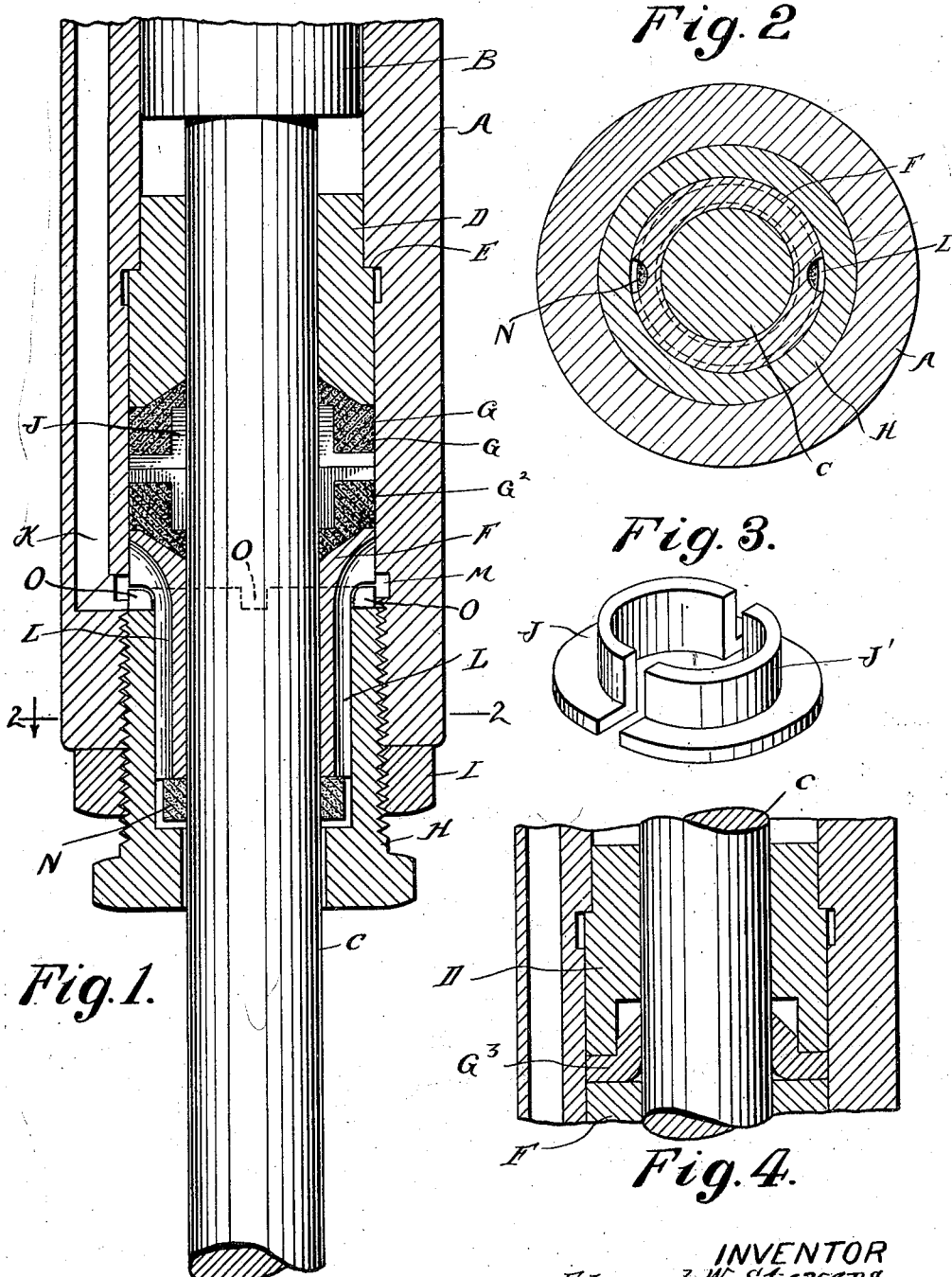

1,495,500

UNITED STATES PATENT OFFICE.

EDWARD WISER STEVENS, OF DETROIT, MICHIGAN, ASSIGNOR TO CHICAGO PNEUMATIC TOOL COMPANY, OF NEW YORK, N. Y., A CORPORATION OF NEW JERSEY.

PACKING FOR PNEUMATIC TOOLS.

Application filed January 30, 1922. Serial No. 532,553.

*To all whom it may concern:*

Be it known that I, EDWARD W. STEVENS, a citizen of the United States of America, residing at Detroit, in the county of Wayne and State of Michigan, have invented certain new and useful Improvements in Packings for Pneumatic Tools, of which the following is a specification, reference being had therein to the accompanying drawings.

The invention relates to pneumatic tools and more particularly to constructions adapted for use where exposed to dust and grit, such, for instance, as in sand rammers. It is the object of the invention to provide a construction which will form an effective air seal for the plunger, and one which does not require frequent adjustment or which will be destroyed or injured by the grit to which the tool is exposed. With this end in view the invention consists in the construction as hereinafter set forth.

In the drawings:

Figure 1 is a central longitudinal section through a portion of the pneumatic tool showing my improvements applied thereto;

Figure 2 is a cross-section substantially on line 2—2 of Figure 1;

Figure 3 is a perspective view showing the sectional packing rings;

Figure 4 is a longitudinal section showing a modified construction.

A is the barrel or cylinder of a pneumatic tool, B the piston therein, and C the piston shank or rod. D is a bushing or guide for the piston rod fitting about the same and having a shouldered engagement at E on the barrel or cylinder. F is a second bushing or guide sleeved upon the piston rod and G is the sealing packing arranged between said bushings. H is a gland having a threaded engagement with the end of the barrel and bearing against an inner annular enlargement or flange of bushing F. I is a lock nut for gland H, and N is a wiper or felt washer arranged between the gland and the bushing F.

To obtain a seal which will remain effective with little adjustment, I preferably employ a high grade packing material, such, for instance, as a chrome leather ring. As shown in Figure 1, two of such rings G' and G² are employed, being fashioned to engage the beveled ends of the bushings D and F so as to be forced into sealing contact by the pressure of said bushings. Also, as shown in Figure 3, the flanged split bushings J, J' are provided, these engaging recesses in the rings G', G² and forming bearing surfaces on the rod. Such a construction, if protected from abrasive material, will have a fairly long life and will require little adjustment, but it would soon be destroyed if exposed to sand and grit. I have therefore guarded against such a result by the following construction:

K is a passage in the wall of the barrel A, which is connected with the exhaust air and which leads to a point adjacent to the gland H. L are channels formed in the bushing F extending longitudinally thereof, which channels connect with an annular channel M communicating with the passage K. The inner end of gland H is preferably slotted or castellated as at O to insure communication between channels N and L. The channels L at their outer ends communicate with the chamber in which the wiper N is placed, so that the air discharged will blow over said wiper and out through the clearance space between the gland H and the piston rod. Thus, in operation, any sand or grit which adheres to the piston rod and is carried upward in the return stroke of the piston will first be dislodged by the wiper J and will then be blown out by the air from the passage K and channels L.

In Figure 4 I have shown a modified construction where a single packing ring G³ is placed between the bushings D and F, the construction being otherwise the same.

What I claim as my invention is:

1. In a pneumatic tool, the combination with a plunger and a packing therefor forming an air seal, of a wiper engaging said plunger adjacent said packing, and means for blowing dust and grit away from said wiper.

2. In a pneumatic tool, the combination with a plunger, of a packing for said plunger sealed by the pressure of air thereon, a wiper for said plunger adjacent said packing, and means for blowing dust or grit away from said wiper.

3. In a pneumatic tool, the combination with a plunger, of a packing engaging said plunger and subjected to air pressure to form a seal, a wiper formed of soft material adjacent said packing, and means for blowing the dust or grit away from said wiper.

4. In a pneumatic tool, the combination with a plunger and a packing therefor forming a seal, a wiper on the plunger, and conduit means leading to the plunger adjacent of the packing, the motive fluid passing through said conduit means cooperating with said wiper to prevent dust or grit from working into the packing.

5. In a pneumatic tool, including a cylinder having a bore, a piston reciprocable therein and having a shank extending beyond the front end of the cylinder, a packing located in the front end of said bore and through which the shank passes, a gland secured to the front end of the cylinder, and having an opening through which the shank projects, a passage for supplying motive fluid to the interior of the gland, and a wiper in said gland, whereby fluid entering the gland and passing out through said opening cooperates with said wiper to prevent dust or grit from working into the packing.

6. In a pneumatic tool having a cylinder provided with a bore, a piston reciprocable in said bore and having a shank extending beyond the front end of the cylinder, a packing located in the front end of said bore and through which the shank passes, said packing comprising a metal bushing embedded in compressible packing material, a bushing secured in the end of the cylinder for retaining said packing in position, and means for preventing dust and grit from reaching said packing.

7. In a pneumatic tool, the combination with a plunger, of a packing therefor comprising opposed rings of compressible material surrounding said plunger and a metal bushing between said rings to relieve the wear on the latter, and means cooperating with the exhaust of said tool for preventing dust and grit from working into said packing.

8. In a pneumatic tool, the combination with a plunger, of a packing therefor comprising opposed rings of compressible material surrounding said plunger and a flanged metal bushing between said rings with its axially disposed flanges fitting into recesses in said rings, and means cooperating with the exhaust of said tool for preventing dust and grit from working into said packing.

9. In a pneumatic tool, the combination with a piston having a projecting shank, of a packing for said piston shank comprising a pair of packing rings flared in opposite directions and opposed flanged bushings interposed between said rings, said bushings fitting in suitable recesses in said rings, and means cooperating with the exhaust of said tool for preventing dust and grit from working into said packing.

10. In a pneumatic tool, the combination with a plunger, of a packing therefor comprising a flanged bushing of relatively incompressible material embedded in compressible packing material, and means cooperating with the exhaust of the tool for preventing dust and grit from working into the packing.

11. In a pneumatic tool, the combination with a piston having a shank projecting beyond the tool and a packing forming an air seal with the piston shank, of a wiper engaging said shank adjacent said packing, and means for blowing dust and grit away from said wiper.

12. In a pneumatic tool, the combination with a piston having a projecting shank, of a packing engaging said shank and subjected to air pressure to form a seal, a wiper for said shank adjacent said packing, and means for blowing dust and grit away from said wiper.

13. In a pneumatic sand rammer, a wiper engaging the piston shank for removing dust and grit adhering thereto, and means for directing at least a part of the exhaust motive fluid of the rammer upon said wiper to blow away the dust and grit intercepted thereby.

14. In a pneumatic sand rammer, an annual wiper of soft material encircling the piston shank, means limiting the movement of said wiper on said shank, and means directing at least a part of the exhaust motive fluid of the rammer upon said wiper to plow away the dust and grit intercepted thereby as said shank reciprocates therethrough.

In testimony whereof I affix my signature.

EDWARD WISER STEVENS.